(12) United States Patent
Takata

(10) Patent No.: US 6,357,729 B1
(45) Date of Patent: Mar. 19, 2002

(54) WEIGHT ADJUSTING MECHANISM FOR A SUSPENSION SEAT

(75) Inventor: Yasuhide Takata, Hiroshima (JP)

(73) Assignee: Delta Tooling Co., Ltd., Hiroshima (JP)

( * ) Notice: Subject to any disclaimer, the term of this patent is extended or adjusted under 35 U.S.C. 154(b) by 0 days.

(21) Appl. No.: 09/620,903

(22) Filed: Jul. 20, 2000

(30) Foreign Application Priority Data

Jul. 21, 1999 (JP) .......................................... 11-206112

(51) Int. Cl.[7] ................................................ B60N 2/54
(52) U.S. Cl. ...................... 267/131; 267/177; 267/178; 248/576
(58) Field of Search ................................. 267/131, 136, 267/177, 178; 248/565, 576, 620

(56) References Cited

U.S. PATENT DOCUMENTS

| 3,823,932 A | * | 7/1974 | Simons | 267/133 |
| 4,241,894 A | * | 12/1980 | Okuyama | 248/576 |
| 4,659,052 A | * | 4/1987 | Nagata | 248/575 |
| 4,702,454 A | * | 10/1987 | Izumida | 248/585 |
| 5,125,631 A | * | 6/1992 | Brodersen et al. | 267/131 |
| 5,358,305 A | * | 10/1994 | Kaneko et al. | 296/65.1 |
| 5,794,911 A | * | 8/1998 | Hill | 248/588 |

FOREIGN PATENT DOCUMENTS

| EP | 0 448 340 | 9/1991 |
| EP | 0 878 638 | 11/1998 |

* cited by examiner

Primary Examiner—Christopher P. Schwartz
Assistant Examiner—Bradley King
(74) Attorney, Agent, or Firm—Wenderoth, Lind & Ponack, L.L.P.

(57) ABSTRACT

A weight adjusting mechanism is mounted in a suspension seat and includes a lower frame and an upper frame vertically movably mounted on the lower frame via a link mechanism. The upper and lower frames have respective permanent magnets mounted thereon with like magnetic poles opposed to each other. An operation member is pivotally mounted on the upper frame, and a metal spring connected to the link mechanism is also connected to the operation member to produce a lifting force of the upper frame. Weight adjustment is conducted by changing an elastic force of the metal spring.

2 Claims, 6 Drawing Sheets

WEIGHT ADJUSTING MECHANISM FOR A SUSPENSION SEAT

BACKGROUND OF THE INVENTION

1. Field of the Invention

The present invention relates generally to a suspension seat employing a magneto-spring and, in particular but not exclusively, to a weight adjusting mechanism for adjusting for the weight of a seat occupant on the suspension seat.

2. Description of the Related Art

In recent years, accompanying the practical use of permanent magnets that have a high coercive force and high residual magnetic flux density, research is flourishing on magnetic controls for magnetic levitation, magnetic bearings, dampers employing a magnetic fluid, etc. Because magnetic levitation damping technology makes it possible to support physical objects with no actual physical contact, its merits include reduction of problems related to friction and wear, the capability for motion at very high speeds, and low levels of vibration and noise.

Recently, a suspension seat employing a magneto-spring in which like magnetic poles are opposed to each other has been proposed, and research thereon is advancing.

Although suspension seats have a weight adjusting mechanism for absorbing the weight difference between seat occupants, the actual situation in the suspension seat employing the magneto-spring is such that the detailed construction is still open to further discussion and no sufficient investigation has been conducted on the weight adjusting mechanism.

In conventional suspension seats employing metal springs, weight adjustment is generally conducted by a dial-type adjuster in which the tension of the metal springs is changed. Such weight adjustment is disadvantageous in that the range for adjustment is wide and adjustment is troublesome.

SUMMARY OF THE INVENTION

The present invention has been developed to overcome the above-described disadvantages.

It is accordingly an objective of the present invention to provide a weight adjusting mechanism for a suspension seat that is superior in operability and has a simple construction.

In accomplishing the above and other objectives, the weight adjusting mechanism according to the present invention includes a lower frame and an upper frame vertically movably mounted on the lower frame via a link mechanism. The upper and lower frames have respective permanent magnets secured thereto with like magnetic poles opposed to each other. An operation member is pivotally mounted on the upper frame, and a metal spring having a first end connected to the link mechanism is connected at a second end thereof to the operation member to produce a lifting force of the upper frame so that weight adjustment may be conducted by changing an elastic force of the metal spring.

By this construction, the weight adjustment can be conducted merely by moving the operation member, making it possible to provide an easy-to-operate weight adjustment mechanism of a simple construction.

Conveniently, the weight adjusting mechanism further includes a locking member mounted on the operation member for locking the operation member, wherein the operation member is movable between a locking position where the operation member is locked by the locking member and a lock-released position where locking of the operation member is released, and wherein the lifting force of the upper frame at the locking position is greater than that at the lock-released position.

By this construction, the weight adjustment can be conducted merely by moving the operation member between the locking position and the lock-released position.

Again conveniently, the locking member is rotatably mounted on the operation member, and the upper frame has a stopper, wherein the operation member is locked by first moving the operation member at the lock-released position towards the locking position, and by subsequently bringing the locking member into contact with the stopper to rotate the locking member, and the locking of the operation member is released by bringing the locking member at the locking position into contact with the stopper again to further rotate the locking member.

This construction simplifies the locking and the lock-releasing of the operation member, thus enhancing the operability of the weight adjusting mechanism.

BRIEF DESCRIPTION OF THE DRAWINGS

The above and other objectives and features of the present invention will become more apparent from the following description of a preferred embodiment thereof with reference to the accompanying drawings, throughout which like parts are designated by like reference numerals, and wherein.

DETAILED DESCRIPTION OF THE PREFERRED EMBODIMENTS

This application is based on application No. 11-206112 filed Jul. 21, 1999 in Japan, the content of which is incorporated hereinto by reference.

Figure 1:
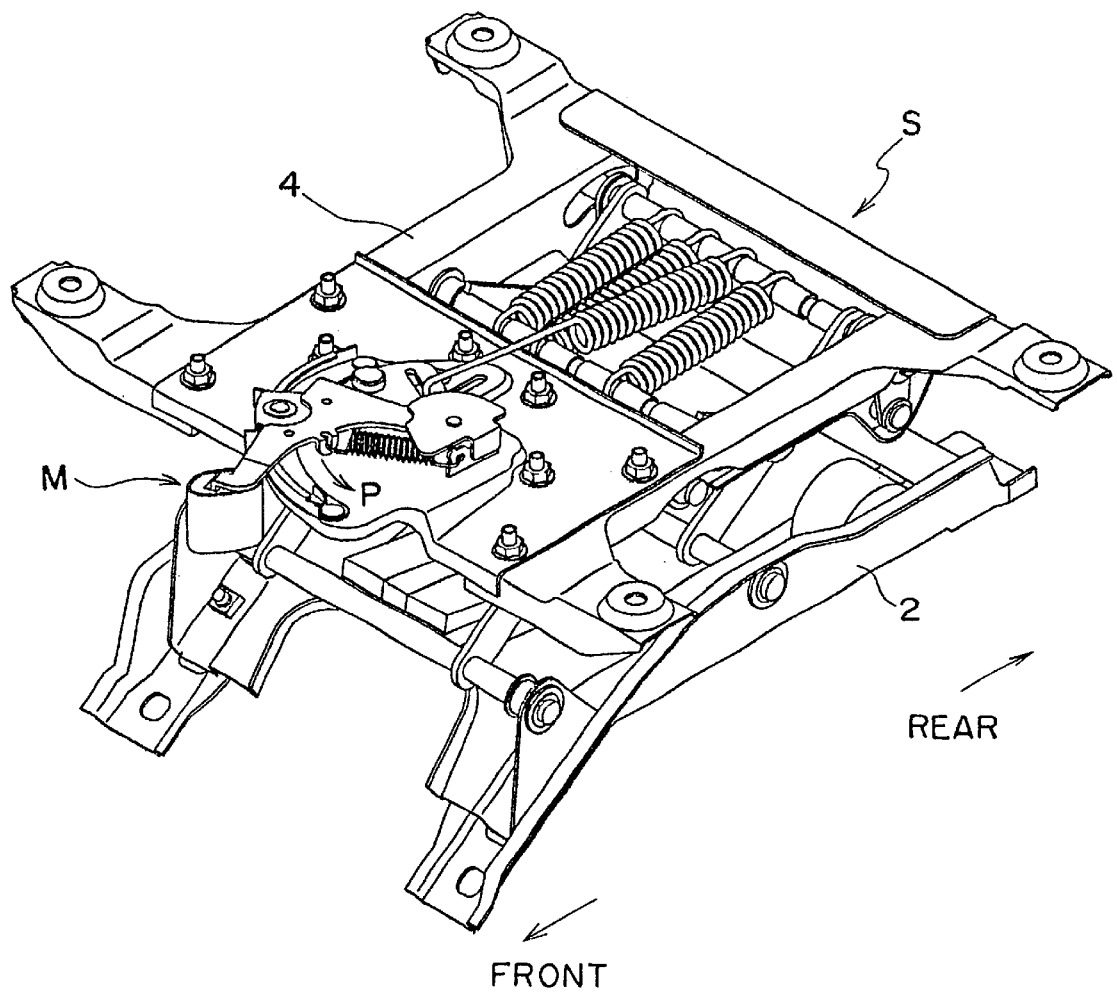
FIG. 1 is a perspective view of a suspension unit having a weight adjusting mechanism according to the present invention.

Referring now to the drawings, there is shown in FIG. 1 a suspension unit S having a weight adjusting mechanism M according to the present invention. As shown therein, the suspension unit S includes a lower frame 2 that is to be secured to a vehicle floor or the like (on the side of a vibration source) and an upper frame 4 vertically movably mounted on the lower frame 2 via link mechanisms. A seat (not shown) is mounted on the upper frame 4, thus providing a suspension seat.

Figure 2:
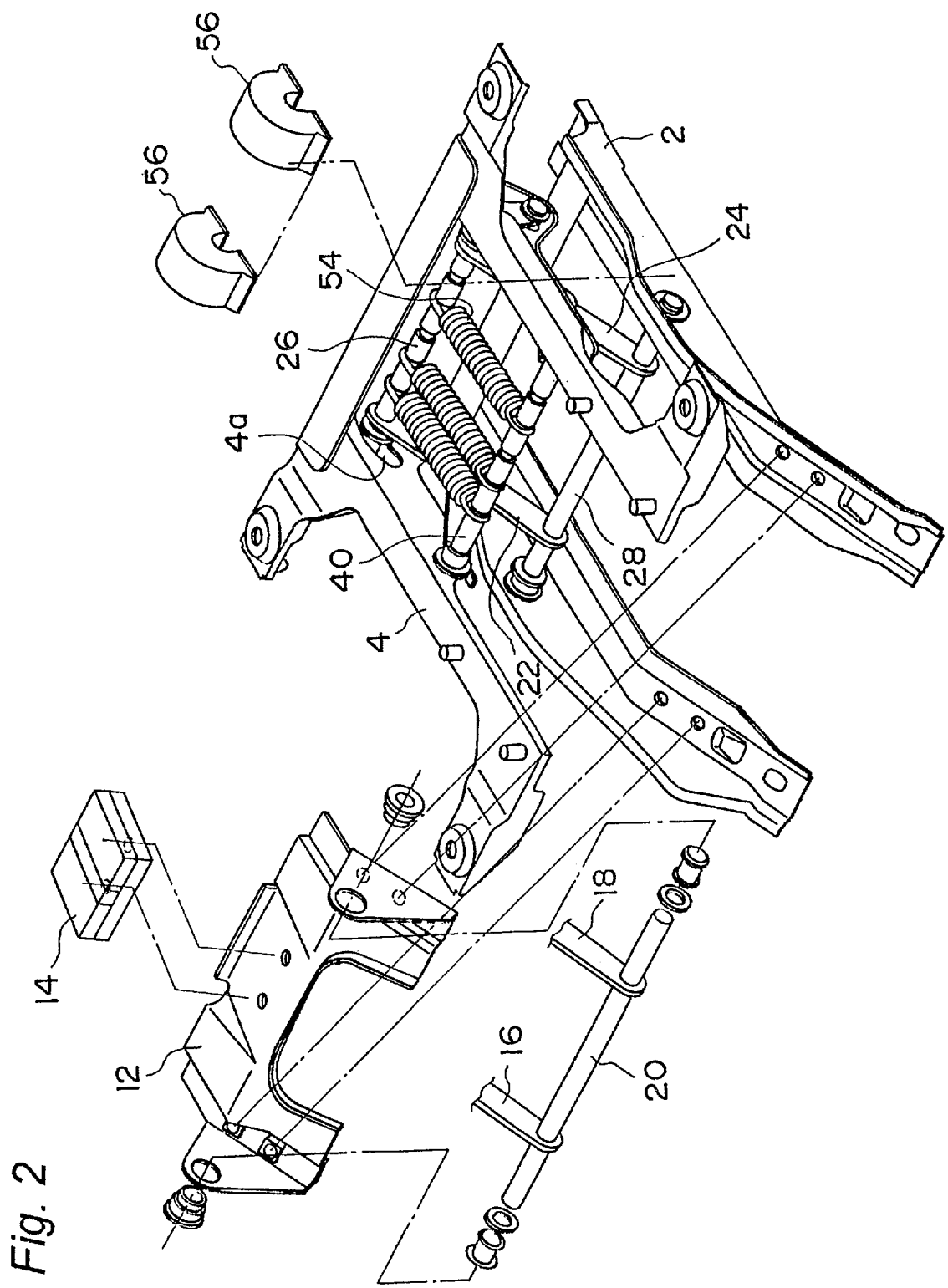
FIG. 2 is an exploded perspective view of a portion of the suspension unit of FIG. 1.
Figure 3:
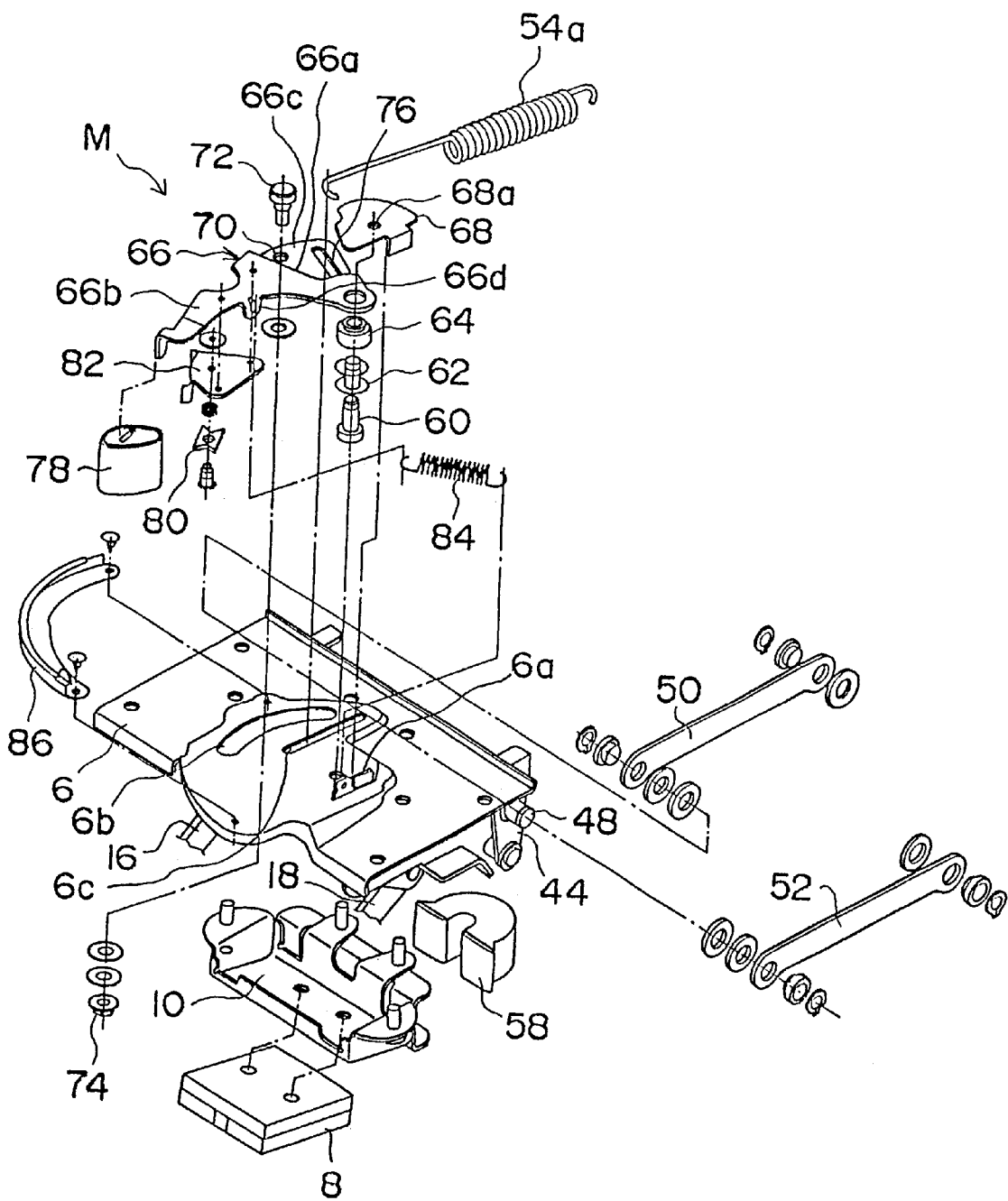
FIG. 3 is an exploded perspective view of another portion of the suspension unit of FIG. 1.

As shown in FIGS. 2 and 3, the weight adjusting mechanism M is mounted on the upper surface of a base plate 6 that is bolted to a front portion of the upper frame 4. An inclined upper magnet 8 is secured to an upper magnet holder 10, which is in turn bolted to the lower surface of the base plate 6. The weight adjusting mechanism M is discussed later in detail.

On the other hand, an inclined lower magnet 14 is secured to a lower magnet holder 12, which is in turn bolted to a front portion of the lower frame 2. The upper and lower magnets 8, 14 have opposing surfaces extending parallel to each other, and on the side of the opposing surfaces, like magnetic poles are opposed to each each other, thus producing a repulsive force that acts to lift the upper frame 4.

The link mechanisms include a front link mechanism and a rear link mechanism. The front link mechanism includes a pair of parallel links 16, 18 disposed on respective sides of the suspension unit S. The links 16, 18 have upper ends pivotally connected to the base plate 6 and lower ends connected to a shaft 20, which is in turn pivotally connected to the lower magnet holder 12.

The rear link mechanism similarly includes a pair of parallel links 22, 24 disposed on respective sides of the suspension unit S. The links 22, 24 have upper ends connected to a shaft 26 and lower ends connected to a shaft 28, which is in turn pivotally connected to the lower frame 2.

Figure 4:
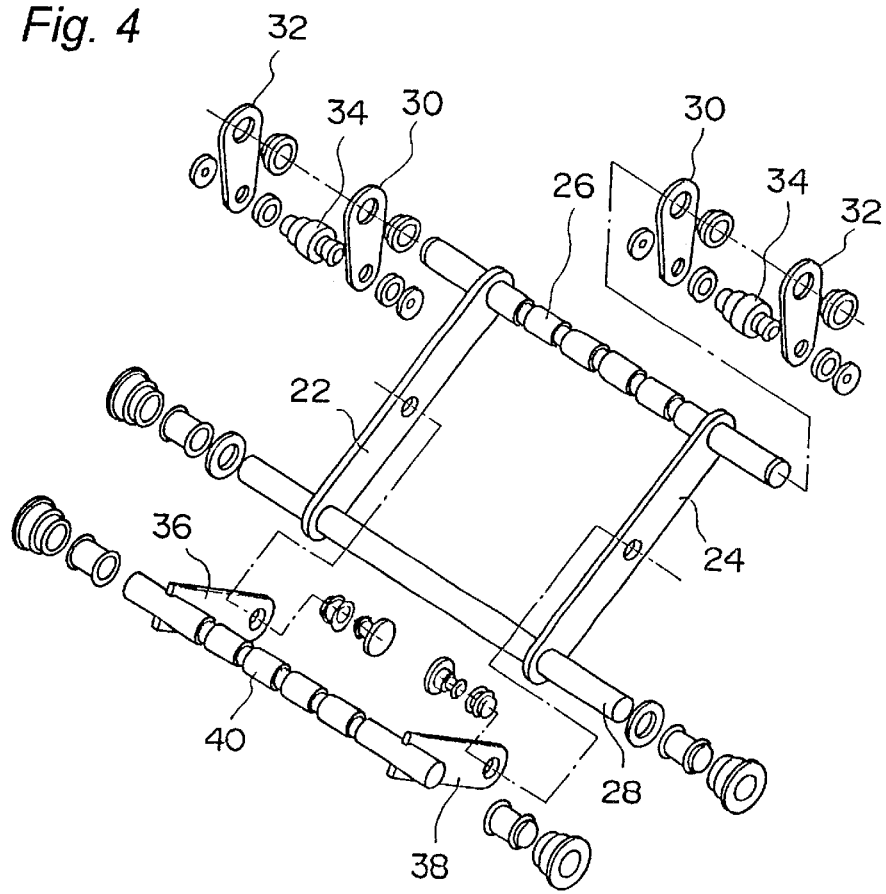
FIG. 4 is an exploded perspective view of a further portion of the suspension unit of FIG. 1.

As shown in FIGS. 2 and 4, opposite ends of the shaft 26 are loosely inserted into respective arcuated openings 4a, 4a defined in the upper frame 4, and each end is pivotally connected to upper ends of a pair of levers 30, 32, lower ends of which are pivotally connected to the upper frame 4 via a lever-connecting shaft 34.

Levers 36, 38 are pivotally connected at lower ends thereof to intermediate portions of the links 22, 24, and upper ends of the levers 36, 38 are secured to a shaft 40 pivotally connected to the upper frame 4. Opposite ends of the shaft 40 are pivotally connected to lower ends of levers 42, 44 (only lever 44 is shown in FIG. 3), respectively, and lever shafts 46, 48 (only lever shaft 48 is shown in FIG. 3) secured to upper ends of the levers 42, 44 and opposite ends of the shaft 26 are connected to each other via connecting links 50, 52, respectively.

Opposite ends of a plurality of metal springs (for example, coil springs) 54 are engaged with the shaft 26 and the shaft 40, respectively, so that the tension of the metal springs 54 may be used to lift the upper frame 4. One 54a of the plurality of metal springs 54 is engaged with the shaft 26 and a portion of the weight adjusting mechanism M so that weight adjustment may be conducted by changing the elastic force (tension) of such metal spring 54a. The weight adjustment is discussed later.

The suspension unit S of the above-described construction has non-linear spring characteristics wherein the spring force of a magneto-spring constituted by the upper and lower magnets 8, 14 and the spring force of the plurality of metal springs 54 have been combined. This suspension unit S attenuates input from a vibration source to a given amplitude, and converts the attenuated vibration to micro vibration via the link mechanisms to absorb it.

When an impact is input, or in a resonant region in which the amplitude s increased, rubber stoppers 56, 56 disposed on respective sides of the lower frame 2 and a rubber stopper 58 mounted on the upper magnet holder 10 work directly beyond the spring function of the link mechanisms, thus attenuating the impact.

It is to be noted that the suspension unit S is not the subject of the present invention and, hence, explanation thereof is omitted.

The weight adjusting mechanism M according to the present invention is explained hereinafter with reference to FIGS. 1 to 3.

The weight adjusting mechanism M includes an operation lever 66 mounted on the base plate 6 so as to freely pivot about a pin 60 that is secured to the base plate 6 via two bushings 62, 64. An upper end of the pin 60 is inserted into an opening 68a defined in a plate 68 at a central portion thereof, and the plate 68 is secured or joined to a projection 6a formed on or with the base plate 6. The operation lever 66 is formed from a piece of iron or steel plate and has an upper portion 66b and a lower portion 66c formed at front and rear portions thereof, respectively, with a stepped portion 66a formed intermediately thereof as the border.

The operation lever 66 has a round hole 70 defined in the lower portion 66c thereof at a location spaced a predetermined distance from the pin 60. A bolt 72 inserted into the round hole 70 is loosely inserted into an arcuated guide hole 6b defined in the base plate 6 and is threaded into a nut 74. As described later, because the bolt 72 moves along the arcuated guide hole 6b, the radius of curvature of the arcuated guide hole 6b is set to be equal to the radius of rotation of the bolt 72 (the distance between the bolt 72 and the pin 60).

The operation lever 66 also has an elongated hole 76 defined therein at a location rearwardly of the round hole 70 and extending substantially straight on the same line as the pin 60. The metal spring 54a connected at one end thereof to the shaft 26 is connected at the other end thereof to the lower portion 66c of the operation lever 66 via the elongated hole 76, and the other end of the metal spring 54a is loosely inserted into an elongated hole 6c defined in the base plate 6 at a location adjacent to he arcuated guide hole 6b.

The operation lever 66 has an operation knob 78 mounted on a free end thereof, and a bracket 82, to which a locking member 80 is rotatably mounted, is threaded to an intermediate portion between the stepped portion 66a and the operation knob 78. The locking member 80 has two V-shaped notches 80a, 80a formed in opposite end portions thereof, respectively. The bracket 82 has a bent portion 82a formed at a free end thereof and having an elongated opening 82b defined therein (see FIGS. 6 to 9).

The operation lever 66 is biased in the direction of an arrow P in FIG. 1 by an elastic force of a coil spring 84 that is engaged at opposite ends thereof with a bent portion 66d formed on the upper portion 66b in the proximity of the bracket 82 and with the projection 6a of the base plate 6.

Figure 5:
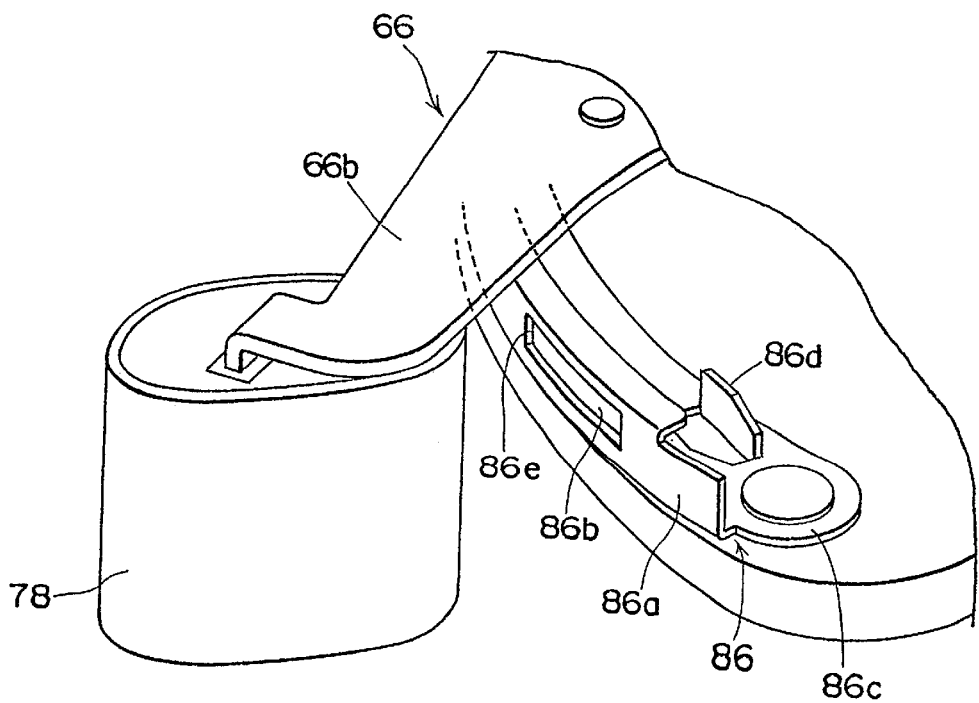
FIG. 5 is a perspective view of a portion of the weight adjusting mechanism according to the present invention.

A guide member 86 that extends arcuately and frontwardly along an outer edge of the arcuated guide hole 6b and has a generally L-shaped cross section is threaded to the base plate 6. As shown in FIG. 5, the guide member 86 has an elongated opening 86b defined in a front side wall 86a the same configuration as the elongated opening 82b in the bracket 82. The guide member 86 also has a projection 86d formed at a bottom wall 86c thereof by cutting and raising a portion of the bottom wall 86c. This projection 86d acts as a stopper.

The operation of the above-described weight adjusting mechanism M is discussed hereinafter with reference to FIGS. 6 to 9.

In a lock-released position where the bolt 72 is located at a rear end portion of the arcuated guide hole 6b in the base plate 6 and the coil spring 84 has been pulled by the elastic force of the metal spring 54a, the metal spring 54a is held free. Under such condition, even when the suspension seat moves up and down, the elastic force of the metal spring 54a has no influence on the lifting force.

When the operation knob 78 is pressed frontwardly (in the direction of an arrow Q) against the elastic force of the metal spring 54a for weight adjustment, the bolt 72 moves frontwardly along the arcuated guide hole 6b, and the locking member 80 similarly moves frontwardly along the arcuated guide member 86.

Figure 6:
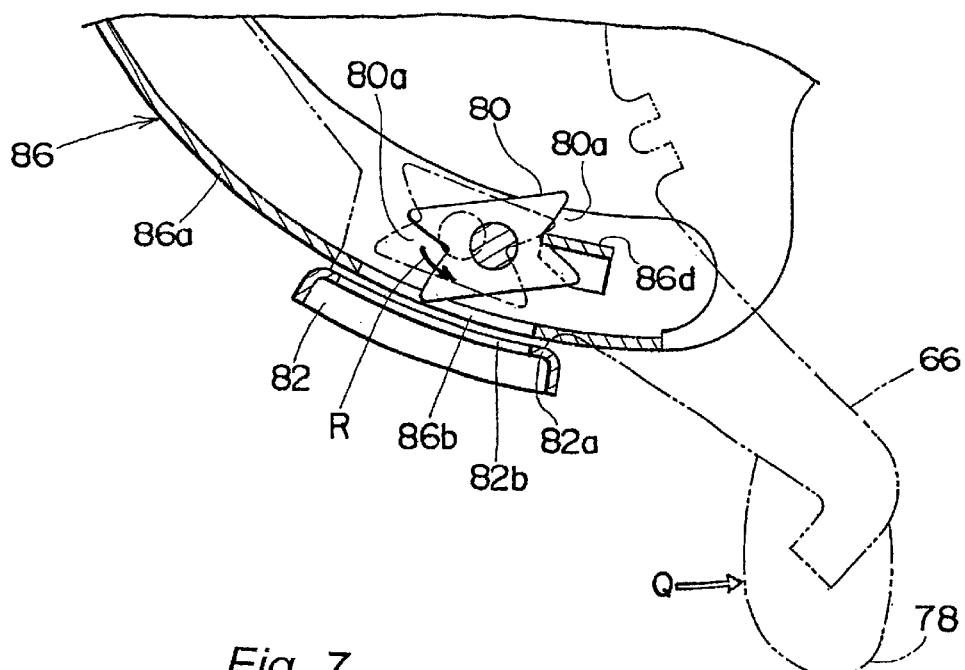
FIG. 6 is a top plan view of the weight adjusting mechanism of FIG. 5, partially in section, when an operation lever is being locked by operating an operation knob.

As shown by a single-dotted chain line in FIG. 6, when one (this corner is hereinafter referred to as a first corner, and other corners as second, third, and fourth corners in the clockwise direction) of corners of the locking member 80 is brought into contact with the projection 86d of the guide member 86, the locking member 80 is rotated a predetermined angle in the direction of an arrow R, and the projection 86d is introduced into a bottom portion of the V-shaped notch 80a of the locking member 80, while the third corner of the locking member 80 is introduced into the elongated opening 86b in the side wall 86a of the guide member 86.

Figure 7:
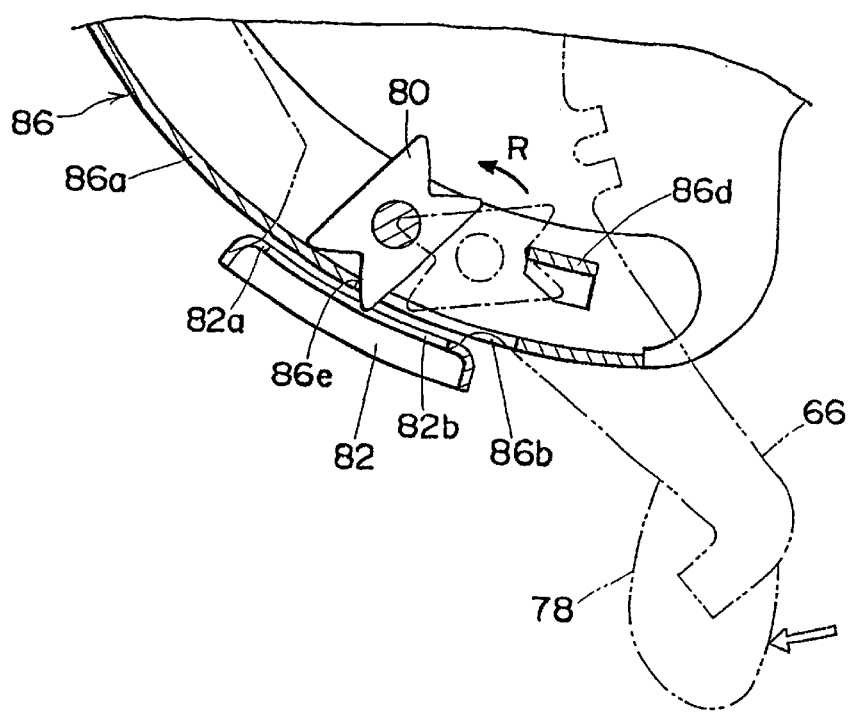
FIG. 7 is a view similar to FIG. 6, but illustrating the locked state of the operation lever.

At this moment, when the operation knob 78 is released, the operation lever 66 is moved rearwardly (in the direction counter to the arrow Q) by the elastic force of the metal spring 54a, as shown in FIG. 7, and the third corner of the locking member 80 is brought into contact with a rear edge 86e of the elongated opening 86b, thereby rotating the locking member 80 a predetermined angle in the direction of an arrow R. As a result, the fourth corner of the locking member 80 is brought into and held in contact with the inner surface of the side wall 86a of the guide member 86. This position is a locking position where the operation lever 66 is locked.

In the locking position, the metal spring 54a provides a predetermined tension (for example, about 7 kg). When the suspension seat moves up and down, the tension of the metal spring 54a serves as a lifting force of the upper frame 4, enabling weight adjustment (for example, about 25 kg) corresponding to one metal spring.

Figure 8:
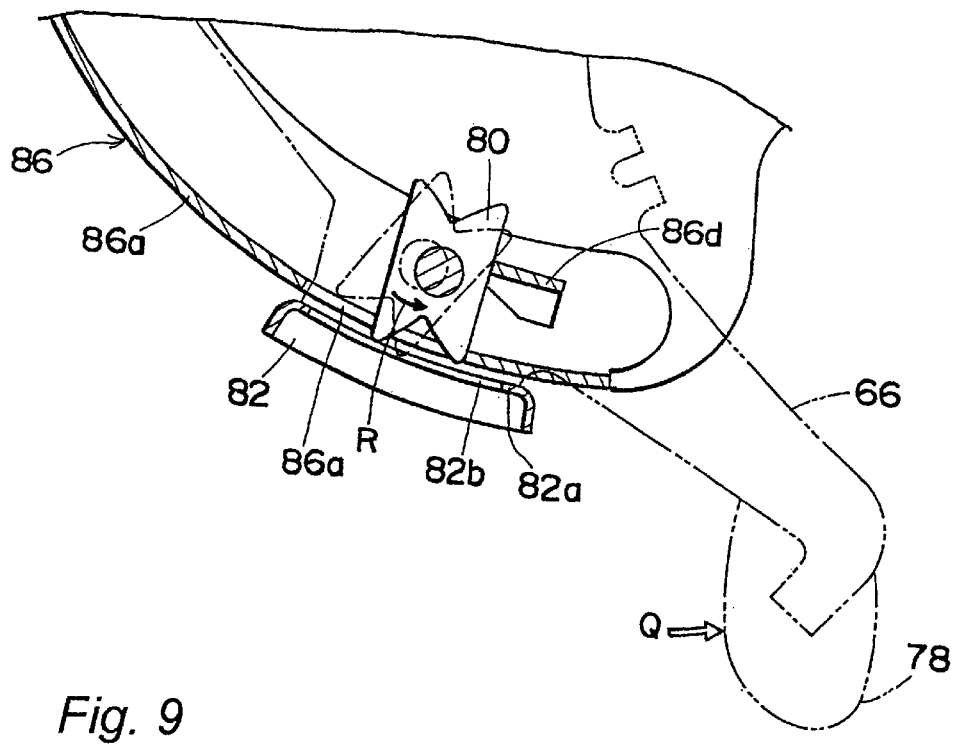
FIG. 8 is a view similar to FIG. 6, but illustrating the condition when the locking of the operation lever is being released by operating the operation knob.

As shown in FIG. 8, when the operation knob 78 is pressed in the direction of the arrow Q to release the locking of the operation lever 66, a side edge of the locking member 80 is brought into contact with the projection 86d, thereby rotating the locking member 80 a predetermined angle in the direction of the arrow R.

Figure 9:
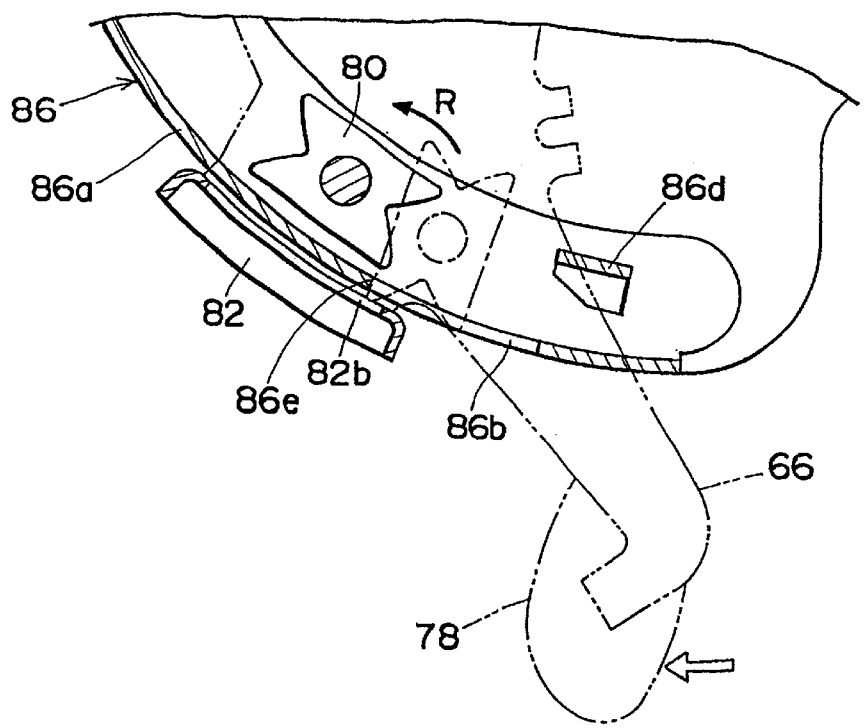
FIG. 9 is a view similar to FIG. 6, but illustrating the condition after the locking of the operation lever has been released.

Under such condition, when the operation knob 78 is released, the operation lever 66 is moved rearwardly (in the direction counter to the arrow Q) by the elastic force of the metal spring 54a, as shown in FIG. 9, and the fourth corner of the locking member 80 is brought into contact with the rear edge 86e of the elongated opening 86b, thereby rotating the locking member 80 a predetermined angle in the direction of the arrow R. As a result, the engagement of the locking member 80 with the side wall 86a of the guide member 86 is released, and the operation lever 66 is moved towards the lock-released position by the elastic force of the metal spring 54a.

While the operation lever 66 moves between the locking position and the lock-released position, the end of the metal spring 54a that engages with the lower portion 66c of the operation lever 66 slides along the elongated hole 76 in the lower portion 66c and along the elongated hole 6c in the base plate 6.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A weight adjusting mechanism for a suspension seat, comprising:

a lower frame;

an upper frame vertically movably mounted on the lower frame;

a link mechanism for supporting the upper frame with respect to the lower frame;

a first permanent magnet mounted on the lower frame and having a magnetic pole of a first polarity opposed to the upper frame;

a second permanent magnet mounted on the upper frame and having a magnetic pole of the first polarity opposed to the magnetic pole of the first polarity of the first permanent magnet;

an operation member pivotally mounted on the upper frame;

a metal spring having a first end connected to the link mechanism and a second end connected to the operation member to produce a lifting force of the upper frame; and a locking member mounted on the operation member for locking the operation member, wherein the operation member is movable between a locking position where the operation member is locked by the locking member and a lock-released position where locking of the operation member is released, and wherein the lifting force of the upper frame at the locking position is greater than that at the lock-released position;

wherein weight adjustment is conducted by changing an elastic force of the metal spring.

2. The weight adjusting mechanism according to claim 1, wherein the locking member is rotatably mounted on the operation member, and the upper frame has a stopper, and wherein the operation member is locked by first moving the operation member at the lock-released position towards the locking position, and by subsequently bringing the locking member into contact with the stopper to rotate the locking member, and the locking of the operation member is released by bringing the locking member at the locking position into contact with the stopper again to further rotate the locking member.

* * * * *